Sept. 13, 1949.  G. J. BENES  2,481,712
TOOL SUPPORT

Filed June 23, 1945  2 Sheets-Sheet 1

INVENTOR:
Gordon J. Benes
BY Stevens & Batchelor
Attorneys.

Sept. 13, 1949.    G. J. BENES    2,481,712
TOOL SUPPORT
Filed June 23, 1945    2 Sheets-Sheet 2

INVENTOR:
Gordon J. Benes
BY Stearns Batcheler
Attorneys.

Patented Sept. 13, 1949

2,481,712

UNITED STATES PATENT OFFICE 2,481,712

TOOL SUPPORT

Gordon J. Benes, Chicago, Ill.

Application June 23, 1945, Serial No. 601,202

1 Claim. (Cl. 29—46)

My invention relates to turret-type tool supports, and more particularly to supports in the nature of a unit designed for application to a lathe or like machine, and my main object is to provide a tool support which resists tendencies to be thrown out of line by the pressure of the work or lateral stresses imposed on the tool.

A further object is to provide a tool support whose position and feed are equalized, whereby to resist the influences referred to above.

Another object is to construct the novel support along lines of compactness, strength and simplicity.

With the above objects in view and any others which may suggest themselves from the description to follow, a better understanding of the invention may be had by reference to the accompanying drawing, in which—

The support illustrated is a conventional type, and only so much thereof will be described as relates to the invention. Thus, 10 denotes the base of the support, which is a block casting adapted by suitable means (not shown) for attachment to a lathe or like machine.

Figure 3:
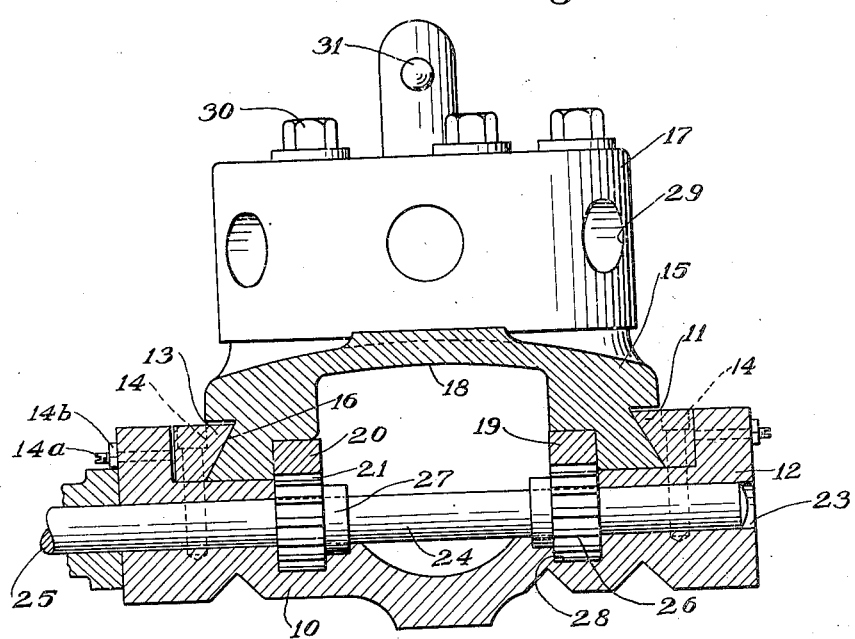
Fig. 3 is a section on the line 3—3 of Fig. 2.

As indicated in Fig. 3, the base 10 is longitudinally channeled from the top, the sections of the channel being indicated at 11. The walls 12 defined by the channel are lined on the inner side by a pair of guide bars 13 secured to the base by vertical socket screws 14. Horizontal set screws 14a are threaded through the walls 12 against the guide bars 13 and secured by external nuts 14b.

A massive slide 15 is disposed with its bottom portion in the base channel 11, the contiguous faces of the said bottom portion and the guide bars 13 being similarly cut to form a dove-tail joint 16. The slide 15 is thus disposed for longitudinal sliding movement over the base 10; and the slide is built up with a conventional turret-type tool holder 17 at its front end. The set screws 14a permit the accurate setting of the guide bars 13 before the screws 14 are tightened, the screw bores in the guide bars being somewhat widened to permit such setting.

Figure 2:
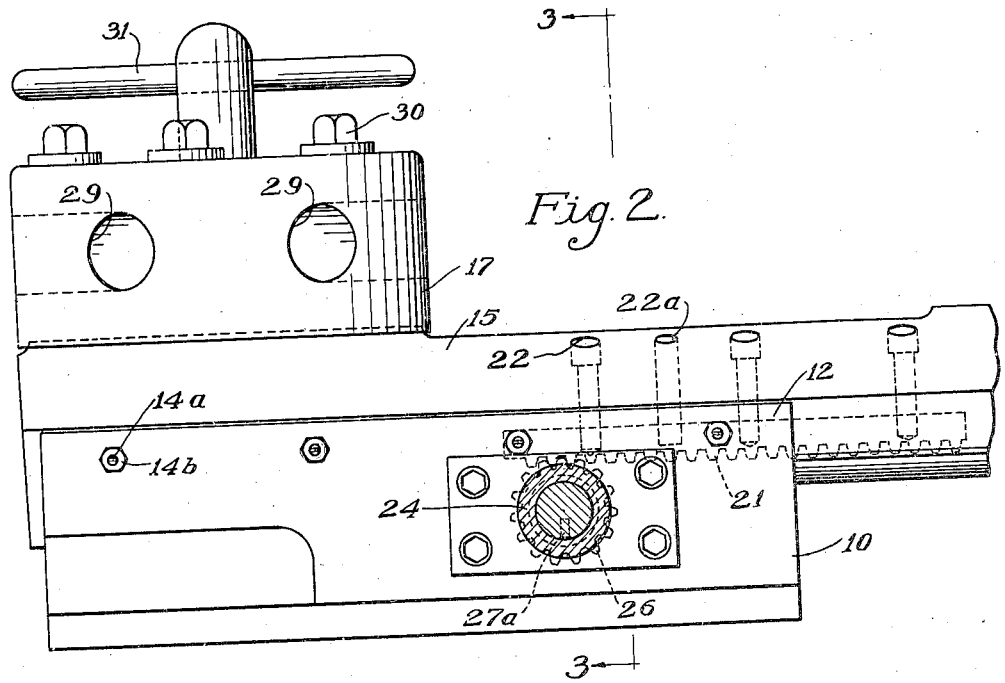
Fig. 2 is a section on the line 2—2 of Fig. 1.

The feed for procuring the longitudinal movement of the slide 15 is illustrated more clearly in Figs. 2 and 3. It is noted that the slide is formed with a cavity 18 on the under side, such cavity having channels 19 along the sides of the slide. The channels 19 are occupied by a pair of rack bars 20 whose teeth 21 face downwardly, the rack bars being secured to the slide by vertical socket screws 22 and dowel pins 22a.

The base 10 is bored transversely below the rack bars 20 as shown at 23 to journal a shaft 24, the latter projecting from one side of the base as indicated at 25 to receive a suitable hand-wheel or crank (not shown). The shaft carries a pair of spur pinions 26 in mesh with the rack bars 20, the pinions having hubs 27 on the inner sides and being keyed to the shaft as shown at 27a. The base 10 is of course suitably recessed—as indicated at 28—to provide clearances for the pinions and hubs; and the pinions are calculated to have a maximum spacing from each other consistent with the width and construction of the slide.

The tool holder 17 has the usual peripheral sockets 29 for the insertion of the tool shanks. Top bolts 30 operate suitable clamps for the tool shanks, while a T-type center handle 31 is usable to rotate the turrent support to project a chosen tool to the work. The application of the tool often imposes lateral stresses thereon, which are transmitted to the slide. The latter is thus forced to one side at the front or may swing to bear toward the opposite side at the rear. The result is the binding of the slide to a greater or lesser extent either at one point in front or diagonally at the front and rear, as indicated. Usually, a single rack-and-pinion feed is used for operating a slide of the character herein considered, the feed being either in the center or along one side. It will now be appreciated that a feed of this character will suffer when the binding referred to occurs and be hard to operate. Besides, the binding will impose wear on the slide and its ways, leading to looseness therebetween.

Figure 1:
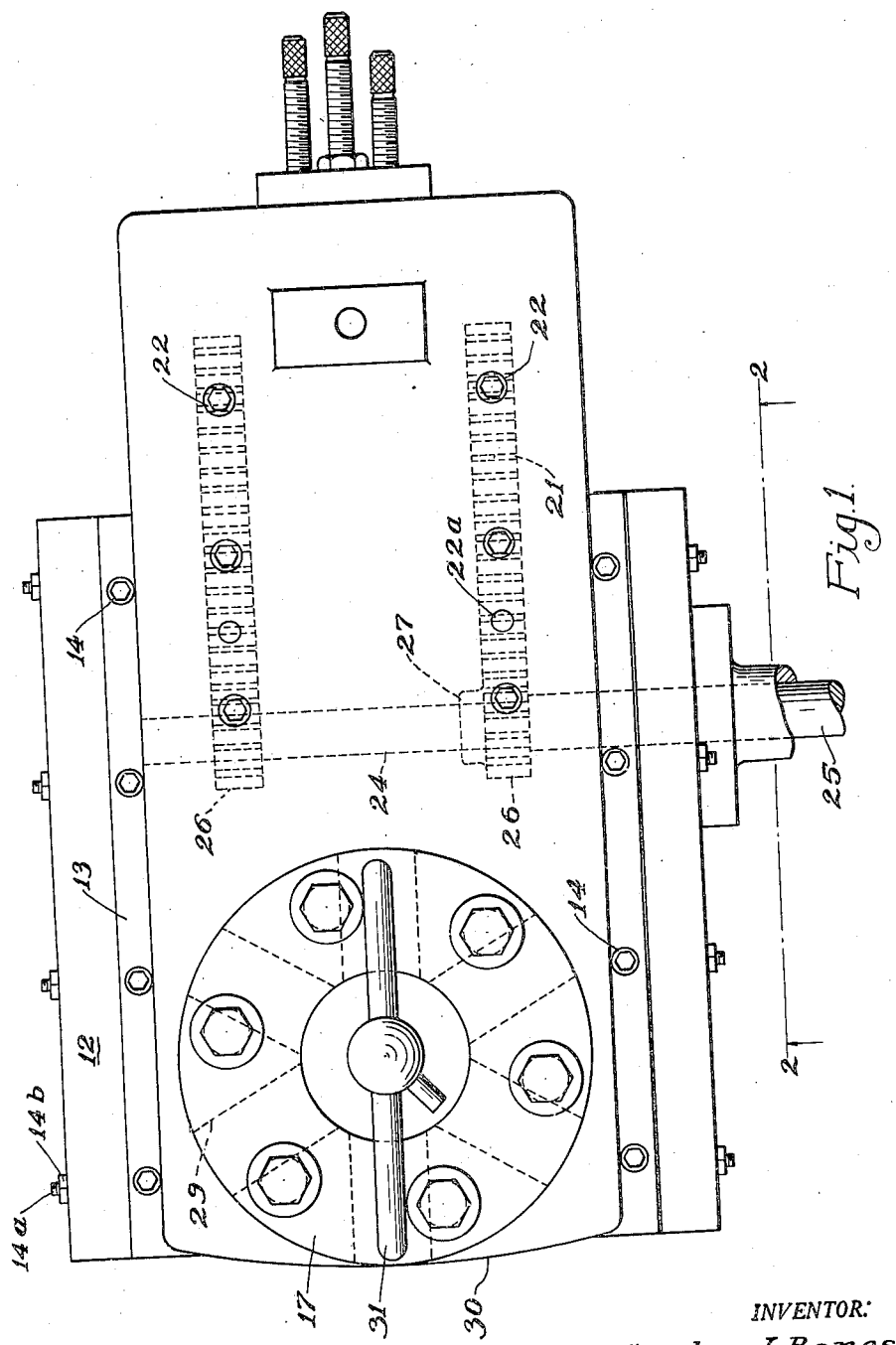
Fig. 1 is a top plan view of the support.

In contrast with the above situation, the showing in Figs. 1 and 3 indicates that the novel feed for the slide is transmitted to a widely-spaced pair of rack bars 20, these being rigidly joined to to the slide. Further, the rack bars are keyed in line to the shaft pinions 26 at all points in the rotation thereof. Thus, any twisting pressure or stresses received by the slide from the working zone is resisted by the pinions 26, which equalize the position of the slide at all points in its travel, prevent it from being thrown out of line, and eliminate the binding of the slide at any point or points. The results are (1) a free and balanced feed for the slide, (2) the elimination of wear by the latter at points where binding would occur, and (3) the preservation of the proper fit and travel of the slide during the useful life of the tool holder. Further, the wide spacing of the pinions places them at a highly favorable leverage to resist backing or twisting strains imposed on the slide. Finally, it is apparent that the above advantages are secured by a simple, compact and rugged arrangement which has no accessory parts or attachments to get out of order and may be built to operate at full efficiency for the lifetime of the machine.

While I have described the invention along specific lines, various minor changes or refinements may be made therein without departing from its principle, and I desire to consider such changes and refinements as coming within the scope and spirit of the appended claim.

I claim:

An attachment for a lathe or like machine comprising in combination, a turret tool support consisting of a base having a transverse bore therethrough, a longitudinal channel formed in the upper surface of said base, gibs adjustably disposed within the channel at opposite sides thereof, each of said gibs having a downwardly tapering inner face, a slide having a pair of guides on its under surface fitting within the channel of the base and shaped to mate with and be engaged by said gibs, longitudinal grooves formed on the under side of the slide and forming recesses along opposite sides thereof, spaced racks mounted within said recesses, a shaft extending crosswise through said bore formed within the base portion, the shaft extending outwardly past one side of the base, spaced recesses formed in said base below said bore, spaced pinions mounted on said shaft and meshing with the racks of the slide and fitting in said recesses, and a rotatable tool turret mounted on the said slide.

GORDON J. BENES.

REFERENCES CITED

The following references are of record in the file of this patent:

UNITED STATES PATENTS

| Number | Name | Date |
|---|---|---|
| 598,257 | Royle | Feb. 1, 1898 |
| 703,660 | De Laval et al. | July 1, 1902 |
| 969,433 | Wigglesworth | Sept. 6, 1910 |
| 1,825,721 | Forward et al. | Oct. 6, 1931 |
| 2,340,450 | Bouschor | Feb. 1, 1944 |